(12) United States Patent
Kim et al.

(10) Patent No.: US 8,894,742 B2
(45) Date of Patent: Nov. 25, 2014

(54) HYBRID OPERATING APPARATUS OF REGENERATIVE HEATER AND HYBRID OPERATING METHOD OF REGENERATIVE HEATER

(75) Inventors: Yu Gon Kim, Yongin-si (KR); Jin Seok Oh, Yongin-si (KR)

(73) Assignee: CK Solution Co., Ltd., Suwon-si, Gyeonggi-do (KR)

( * ) Notice: Subject to any disclaimer, the term of this patent is extended or adjusted under 35 U.S.C. 154(b) by 281 days.

(21) Appl. No.: 13/556,591

(22) Filed: Jul. 24, 2012

(65) Prior Publication Data

US 2014/0027086 A1    Jan. 30, 2014

(51) Int. Cl.
*G05D 23/00* (2006.01)
*B01D 53/06* (2006.01)

(52) U.S. Cl.
USPC ............ 95/10; 95/14; 95/18; 95/113; 95/123; 96/111; 96/112; 96/125

(58) Field of Classification Search
USPC ................ 95/1, 8, 10, 14, 18, 113, 117, 123; 96/111, 112, 125; 62/94, 271, 480; 34/80, 472, 473
See application file for complete search history.

(56) References Cited

U.S. PATENT DOCUMENTS

| | | | | |
|---|---|---|---|---|
| 3,774,374 A | * | 11/1973 | Dufour et al. | 96/112 |
| 4,926,618 A | * | 5/1990 | Ratliff | 95/10 |
| 5,242,473 A | * | 9/1993 | Ogasahara | 96/125 |
| 5,758,511 A | * | 6/1998 | Yoho et al. | 62/271 |
| 8,580,010 B2 | * | 11/2013 | Matsuba et al. | 95/10 |
| 2011/0239867 A1 | * | 10/2011 | Matsuba et al. | 96/143 |

* cited by examiner

*Primary Examiner* — Frank Lawrence
(74) *Attorney, Agent, or Firm* — Sherr & Jiang, PLLC (57) ABSTRACT

A hybrid operating apparatus including an absolute humidity sensing unit configured to sense an absolute humidity of air supplied to a dehumidifying rotor; a dew point temperature sensing unit configured to sense a dew point temperature of air returned from a dry room; a regeneration exhaust temperature sensing unit configured to sense a temperature of exhaust air regenerated in the dehumidifying rotor; a control unit configured to operate the regenerative heater to a regeneration temperature corresponding to the sensed absolute humidity; and a memory unit configured to store the regeneration temperature of the regenerative heater.

12 Claims, 4 Drawing Sheets

FIG. 1

*-Prior Art-*

HYBRID OPERATING APPARATUS OF REGENERATIVE HEATER AND HYBRID OPERATING METHOD OF REGENERATIVE HEATER

TECHNICAL FIELD

The present invention relates to a hybrid operating apparatus and method of a regenerative heater, and more specifically, to an apparatus and method for controlling the operation of a regenerative heater provided to a humidifier for maintaining the inside of a dry room under a desired atmosphere.

BACKGROUND ART

Low-humidity environments are increasingly required in recent production processes. The low-humidity environment, i.e., dry atmosphere is used as an environment essential in the manufacture of lithium-based batteries.

A dry room for maintaining a predetermined atmosphere is employed to improve the quality and yield of products manufactured in the low-humidity environment. In a broad meaning, the dry room is a low-humidity room in which the amount of moisture in air is controlled to a certain value or less. Particularly, a room in which the indoor dew point temperature is −10° C. or lower is called as the dry room. The dry room is distinguished from a low-humidity room with an absolute humidity of about 10 to 30%.

The dry room is used in not only lithium-based battery factories but also hygroscopic stitching fiber production processes, lyophilization food companies, vehicle environment laboratories, laboratories requiring low-humidity conditions, factories, etc.

Figure 1:
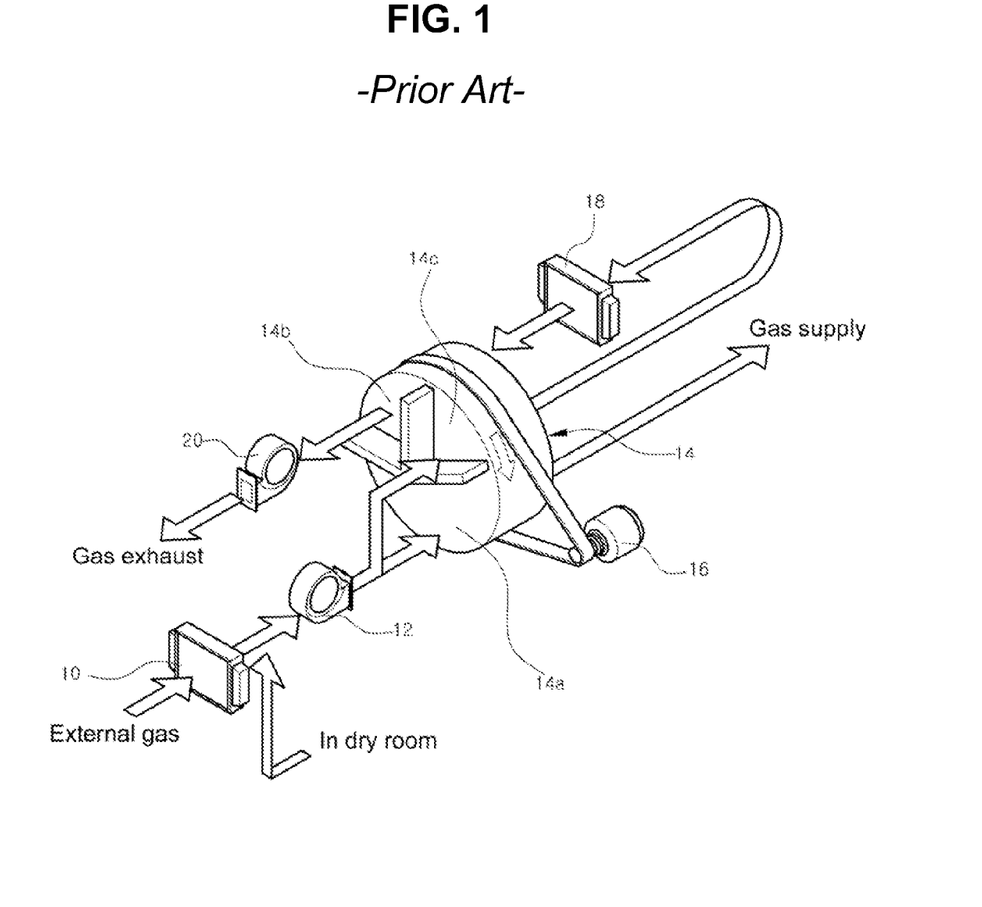
FIG. 1 is a perspective view schematically illustrating a dehumidifying process of a related art dehumidifier.

FIG. 1 is a perspective view schematically illustrating a dehumidifying process of a related art dehumidifier.

If the operation of the dehumidifier is started, a processing fan 12 and a regenerative fan 20 are driven. External gas (external air) is sucked by the driving of the processing fan 12 so as to be transferred to a pre-cooler 10. The pre-cooler 10 performs operations of removing foreign matters, cooling air, etc. The pre-cooler 10 removes moisture contained in the sucked air. The air having the moisture removed by the pre-cooler 10 is transferred to the processing fan 12. In this case, air exhausted through a return flow path (return duct) of a dry room (not shown) is also transferred to the processing fan 12.

The air passing through the processing fan 12 is supplied to dehumidification and fuzzy regions 14a and 14c of a dehumidifying rotor 14. The dehumidifying rotor 14 is belt-connected to a motor 16. The air having humidity removed by the humidification region 14a passes through an after-cooler (not shown) and is then supplied to the dry room (not shown). The humidity of the dry room (not shown) is maintained as a predetermined value by the supplied air, and work is performed in the dry room (not shown). A portion of the air is exhausted to the outside of the dry room (not shown), and the rest of the air is transferred to the processing fan 12 through the return flow path (not shown).

Meanwhile, the air supplied to the fuzzy region 14c of the dehumidifying rotor 14 passes through the fuzzy region 14c and is then transferred to a regenerative heater 18. The regenerative heater 18 heats the transferred air. The heated air is transferred to a regeneration region 14b of the dehumidifying rotor 14. The moisture sucked in the dehumidifying rotor 14 is removed by the regeneration region 14b. The air passing through the regeneration region 14b is exhausted to the outside of the dehumidifier by the regenerative fan 20.

In the related art dehumidifier operated as described above, the regenerative heater 18 always heats the air to an equal regeneration temperature (i.e., 180° C.). In other words, the regenerative heater 18 unconditionally heats the air to the regeneration temperature of 180 so that the dehumidifying rotor 14 achieves maximum performance regardless of indoor humidity, etc. in the dry room.

However, if the regenerative heater 18 is unconditionally operated, the consumption of power is unnecessarily increased, and therefore, operational cost is increased.

Further, the regenerative heater 18 is operated to the same regeneration temperature all through the four seasons, and therefore, the lifetime of the regenerative heater 18 is reduced.

DETAILED DESCRIPTION

Technical Problems

It is thus an object of the present invention to provide a hybrid operating apparatus and method of a regenerative heater, which can efficiently improve dehumidification performance and save energy by regulating the regeneration temperature of the regenerative heater according to various conditions.

Technical Solutions

To solve the objective, the present invention provides a hybrid operating apparatus of a regenerative heater, the apparatus including: an absolute humidity sensing unit configured to sense an absolute humidity of air supplied to a dehumidifying rotor; a dew point temperature sensing unit configured to sense a dew point temperature of air returned from a dry room; a regeneration exhaust temperature sensing unit configured to sense a temperature of exhaust air regenerated in the dehumidifying rotor; a control unit configured to operate the regenerative heater to a regeneration temperature corresponding to the sensed absolute humidity, wherein the control unit controls a current regeneration temperature of the regenerative heater according to a result obtained by comparing the sensed dew point temperature with a setup value and a result obtained by comparing the sensed regeneration exhaust temperature with a set range of regeneration exhaust temperature; and a memory unit configured to store the regeneration temperature of the regenerative heater, set to correspond to a corresponding regeneration exhaust temperature when the regeneration temperature of the regenerative heater, corresponding to the sensed absolute humidity, and the sensed regeneration exhaust temperature are higher than the set range of regeneration exhaust temperature, wherein the setup value is a value previously set in the control unit.

When the sensed dew point temperature is the setup value or less, the control unit may operate the regenerative heater by recovering the current regeneration temperature of the regenerative heater to a predetermined recovery temperature.

When the sensed regeneration exhaust temperature is lower than the minimum value in the set range of regeneration exhaust temperature, the control unit may operate the regenerative heater by recovering the current regeneration temperature of the regenerative heater to the predetermined recovery temperature.

When the sensed regeneration exhaust temperature is higher than the maximum value in the set range of regeneration exhaust temperature, the control unit may operate the regenerative heater to a regeneration temperature set to correspond to the sensed regeneration exhaust temperature.

The absolute humidity sensing unit may be mounted between an outlet of a processing fan sucking external air and an inlet of the dehumidifying rotor.

The dew point temperature sensing unit may be mounted at a front end of a return cooler.

The regeneration exhaust temperature sensing unit may be mounted at a front or rear end of a regenerative fan The apparatus may further include a display unit configured to display a control state of the regenerative heater according to whether the control of the regenerative heater is performed when the sensed dew point temperature is the setup value or less, or performed when the sensed regeneration exhaust temperature is out of the set range of regeneration exhaust temperature.

The present invention provides a hybrid operating method of a regenerative heater, the method including: sensing, by an absolute humidity sensor, an absolute humidity of air supplied to a dehumidifying rotor; sensing, by a dew point temperature sensor, a dew point temperature of air returned from a dry room; sensing, by a regeneration exhaust temperature sensor, a temperature of exhaust air regenerated in the dehumidifying rotor; and operating, by a controller, the regenerative heater to a regeneration temperature corresponding to the sensed absolute humidity, wherein the control unit controls a current regeneration temperature of the regenerative heater according to a result obtained by comparing the sensed dew point temperature with a setup value and a result obtained by comparing the sensed regeneration exhaust temperature with a set range of regeneration exhaust temperature, wherein the setup value is a value previously set in the control unit.

The controlling may include operating the regenerative heater by recovering the current regeneration temperature of the regenerative heater to a predetermined recovery temperature, when the sensed dew point temperature is the setup value or less.

The controlling may include operating the regenerative heater by recovering the current regeneration temperature of the regenerative heater to the predetermined recovery temperature, when the sensed regeneration exhaust temperature is lower than the minimum value in the set range of regeneration exhaust temperature.

The controlling may include operating the regenerative heater to a regeneration temperature set to correspond to the sensed regeneration exhaust temperature, when the sensed regeneration exhaust temperature is higher than the maximum value in the set range of regeneration exhaust temperature.

Advantageous Effects

Based on the above structure, the regenerative heater can be operated by regulating the regeneration temperature of the regenerative heater according to the absolute humidity, the dew point temperature and the regeneration exhaust temperature.

Further, the regenerative heater is operated to about 140 to 180° C. by reflecting various indoor conditions, as compared with the related art method in which the regenerative heater is operated to a constant regeneration temperature regardless of indoor conditions, so that it is possible to improve dehumidification performance and to maximize efficiency of energy saving.

Further, the regeneration temperature of the regenerative heater can be appropriately controlled, and thus it is possible to maximize operation efficiency according to the improvement of working circumstance.

Further, the display unit displays a control state of the regenerative heater according to whether the control of the regenerative heater is performed when the sensed dew point temperature is the setup value or less, or performed when the sensed regeneration exhaust temperature is out of the set range of regeneration exhaust temperature, so that a man on duty (worker) easily recognize the current control state of the regenerative heater and can immediately cope with the current control state.

Further, when a plurality dehumidifier units connected to the apparatus of the present invention are operated in parallel, the absolute humidity at a rotor inlet of each of the dehumidifier units can be sensed, and thus it can be decided whether or not the dehumidifier unit performs a normal operation. For example, if it is measured that the absolute humidity of a first unit is 3.5 g/kg' and the absolute humidity of a second unit is 2.5 g/kg', it can be seen that the amount of air ventilated in the first unit is small and the amount of external air flowed in the first unit is large, and the amount of air ventilated in the second unit is large and the amount of external air flowed in the first unit is small. Thus, the operation state of the apparatus can be identified without passing through a separate test.

BEST MODES FOR PRACTICING INVENTION

The present invention is characterized by appropriately controlling the regeneration temperature of a regenerative heater based on signals sensed using an absolute humidity sensor, a dew point temperature sensor and a regeneration exhaust temperature sensor. Thus, the present invention uses signals sensed by the three sensors, so that the term "hybrid" is employed in the title of the present invention.

Hereinafter, a hybrid operating apparatus and method of a regenerative heater according to an exemplary embodiment of the present invention will be described below with reference to the accompanying drawings. Before the detailed description of the present invention, the terms or words used in the description and the claims of the present invention that will be described below should not be interpreted to limit within the general or dictionary means. Therefore, the configuration as depicted in the exemplary embodiments and the drawings of the present invention is just the most preferable embodiment of the present invention, and does not represent all the technical spirit of the present invention, so that it should be understood that there can be various equivalents and modifications that can be alternatively changed with the present invention at the time of submitting the present invention.

Figure 2:
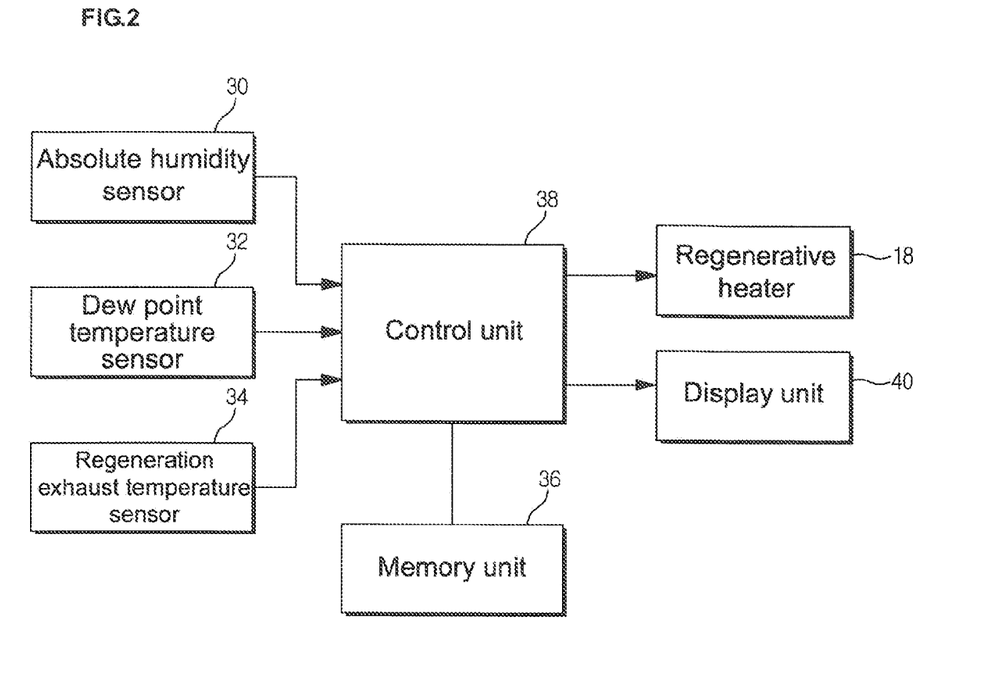
FIG. 2 is a block configuration diagram of a hybrid operating apparatus of a regenerative heater according to an embodiment of the present invention.

FIG. 2 is a block configuration diagram of a hybrid operating apparatus of a regenerative heater according to an embodiment of the present invention.

The hybrid operating apparatus according to the embodiment of the present invention includes an absolute humidity sensor 30, a dew point temperature sensor 32, a regeneration exhaust temperature sensor 34, a memory unit 36, a control unit 38 and a display unit 40.

The absolute humidity sensor 30 senses an absolute humidity of air supplied to a dehumidifying rotor 14. The absolute humidity sensor 30 is an example of an absolute humidity sensing unit described in the claims of the present invention.

The dew point temperature sensor 32 senses a dew point temperature of air returned from a dry room. The dew point temperature sensor 32 is an example of a dew point temperature sensing unit described in the claims of the present invention.

The regeneration exhaust temperature sensor 34 senses a temperature of exhaust air regenerated in the dehumidifying rotor 14. The regeneration exhaust temperature sensor 34 is an example of a regeneration exhaust temperature sensing unit described in the claims of the present invention.

The memory unit 36 stores a regeneration temperature of a regenerative heater 18, corresponding to the sensed absolute humidity and a regeneration temperature of the regenerative heater 18, set to correspond to a corresponding regeneration exhaust temperature when the sensed regeneration temperature is higher than the set range of regeneration exhaust temperature. The regeneration temperature of the regenerative heater 18, corresponding to the sensed absolute humidity and the regeneration temperature of the regenerative heater 18, set to correspond to the corresponding regeneration exhaust temperature are preferably stored in the form of a lookup table.

For example, the regeneration temperature of the regenerative heater 18 for each absolute humidity, stored in the memory unit 36, may be illustrated as follows. If the sensed absolute humidity is about 2.0 g/kg' or less, the regeneration temperature of the regenerative heater 18 is about 140° C. If the sensed absolute humidity is about 2.5 g/kg', the regeneration temperature of the regenerative heater 18 is about 150° C. If the sensed absolute humidity is about 3.0 g/kg', the regeneration temperature of the regenerative heater 18 is about 160° C. If the sensed absolute humidity is about 3.5 g/kg', the regeneration temperature of the regenerative heater 18 is about 170° C. If the sensed absolute humidity is about 4.0 g/kg', the regeneration temperature of the regenerative heater 18 is about 180° C.

Meanwhile, the regeneration temperature of the regenerative heater 18, set to correspond to the corresponding regeneration exhaust temperature may be illustrated as follows. For example, if the sensed regeneration exhaust temperature is about 61 to 64° C., the regeneration temperature of the regenerative heater 18, set to correspond to the sensed regeneration exhaust temperature, is about 170° C. If the sensed regeneration exhaust temperature is about 65 to 69° C., the regeneration temperature of the regenerative heater 18, set to correspond to the sensed regeneration exhaust temperature, is about 160° C. If the sensed regeneration exhaust temperature is about 70° C., the regeneration temperature of the regenerative heater 18, set to correspond to the sensed regeneration exhaust temperature, is about 150° C. If the sensed regeneration exhaust temperature exceeds 70° C., the regeneration temperature of the regenerative heater 18, set to correspond to the sensed regeneration exhaust temperature, is about 140° C.

Information stored in the memory unit 36 may be changed to some degree depending on a circumstance on the spot and/or season. That is, since the summer season is drier than the winter season, the regeneration temperature in the summer season may be lower than that in the winter season even when the absolute humidity in the summer season is the same as that in the winter season. The regeneration temperature for each absolute humidity may be changed for each region. For example, this is considered because there may exist a region in which the humidity (or amount of steam) is relatively high even in the same season. The information stored in the memory unit 36 may be renewed at any time when necessary.

The control unit 38 operates the regenerative heater 18 to the regeneration temperature corresponding to the absolute humidity sensed by the absolute humidity sensor 30. In this case, the control unit 38 controls the current regeneration temperature of the regenerative heater 18 according to a result obtained by comparing the dew point temperature sensed by the dew point temperature sensor 32 with a setup value (e.g., about −45° C.) and a result obtained by comparing the regeneration exhaust temperature sensed by the regeneration exhaust temperature sensor 34 with a set range of regeneration exhaust temperature. In other words, if the dew point temperature sensed by the dew point temperature sensor 32 is the setup value (e.g., about −45° C.) or less, the control unit 38 operates the regenerative heater 18 by recovering the current regeneration temperature of the regenerative heater 18 to a predetermined recovery temperature (e.g., 180° C.). The reason why the recovery temperature is set to 180° C. is that if the recovery temperature of the regenerative heater 18 is set to 180° C., the dehumidifying rotor 14 operates with the best performance at the set recovery temperature. Generally, it is considered that the stable point of dew point temperature is about −40° C. Therefore, in the embodiment of the present invention, the setup value is set to −45° C. in consideration of a slight margin in operation. The setup value (e.g., about −45° C.) is previously set in the control unit 38. The setup value may be regulated when necessary. If the sensed dew point temperature is the setup value (e.g., about −45° C.) or less, the current regeneration temperature of the regenerative heater 18 is recovered to the predetermined recovery temperature (e.g., 180° C.). Here, the 'setup value or less' may be replaced with 'a temperature lower than the setup value.' If the regeneration exhaust temperature sensed by the regeneration exhaust temperature sensor 34 is lower than the minimum value in the set range of regeneration exhaust temperature, the control unit 38 operates the regenerative heater 18 by recovering the current regeneration temperature of the regenerative heater 18 to the recovery temperature (e.g., 180° C.). If the regeneration exhaust temperature sensed by the regeneration exhaust temperature sensor 34 is higher than the maximum value in the set range of regeneration exhaust temperature, the control unit 38 operates the regenerative heater 18 to the regeneration temperature set to correspond to the sensed regeneration exhaust temperature. Here, if the regeneration exhaust temperature sensed by the regeneration exhaust temperature sensor 34 is lower than the minimum value in the set range of regeneration exhaust temperature, the dehumidification performance (ability) is rapidly degraded, and therefore, a dehumidifier cannot perform a normal operation. In order to prevent the rapid degradation of the dehumidification performance, the control unit 38 recovers the current regeneration temperature of the regenerative heater 18 to the predetermined recovery temperature (e.g., 180° C.). If the regeneration exhaust temperature sensed by the regeneration exhaust temperature sensor 34 is higher than the maximum value in the set range of regeneration exhaust temperature, a dehumidification operation is performed more than is necessary, and therefore, unnecessary power loss occurs. In order to prevent the unnecessary power loss (i.e., to save energy), the control unit 38 controls the current regeneration temperature of the regenerative heater 18 according to the sensed regeneration exhaust temperature. The sensed regeneration exhaust temperature range (e.g., 40 to 60° C.) is previously set in the control unit 38. The sensed regeneration exhaust temperature range may be regulated when necessary.

The display unit 40 displays a control state of the regenerative heater 18 according to whether the control of the regenerative heater 18 is performed when the sensed dew point temperature is the setup value or less, or performed when the sensed regeneration exhaust temperature is out of the set range of regeneration exhaust temperature. A man on duty (worker) can recognize a current control state while watching a character message (e.g., a character message such as "the regenerative heater is being controlled to operate at 180° C. because the current dew point temperature is lower than the setup value," "the regenerative heater is being controlled to operate at 180° C. because the current regeneration exhaust temperature is lower than the minimum value in the set range of regeneration exhaust temperature," or "the regenerative heater is being controlled to operate at 160° C. because the current regeneration exhaust temperature is 65° C.") displayed on the display unit 40. It will be apparent that the display unit 40 may display a character message for informing the worker that the regenerative heater is being controlled to operate at a regeneration temperature corresponding to the sensed absolute humidity.

Although it has been illustrated in FIG. 2 that the memory unit 36 and the control unit 38 are separately configured, the memory unit 36 may be included in the control unit 38.

Figure 3:
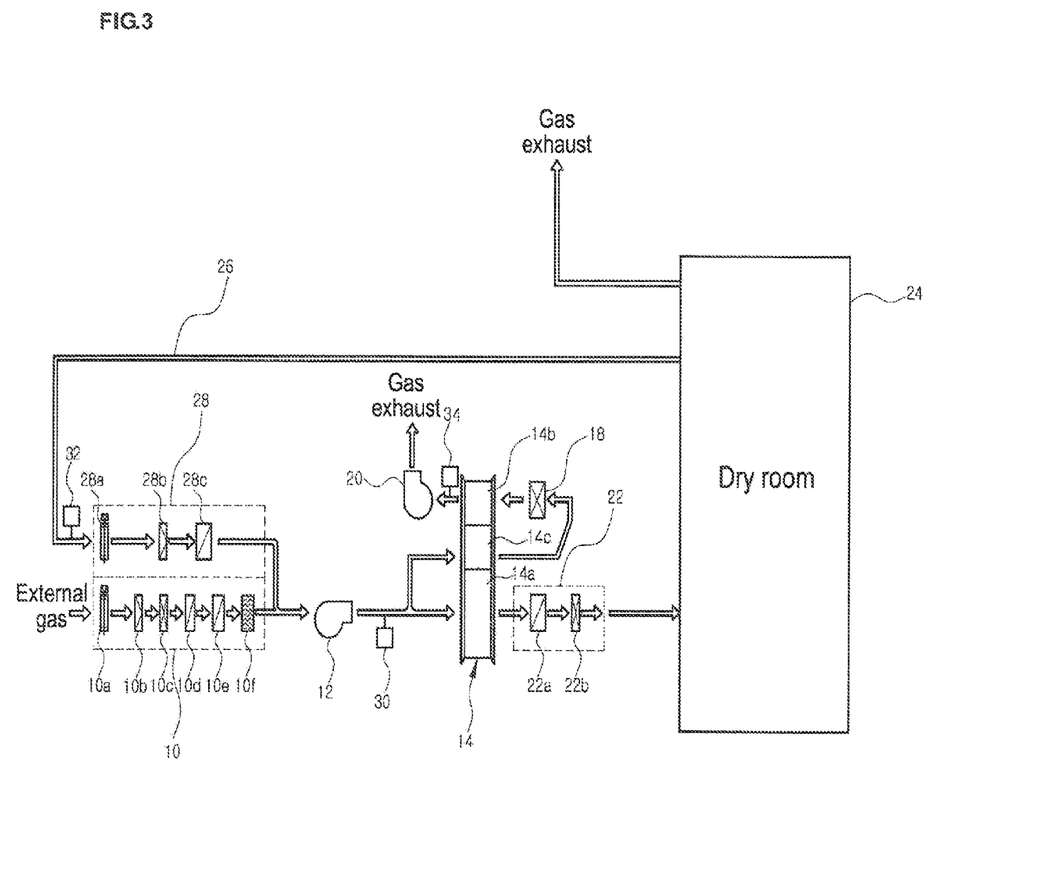
FIG. 3 is a configuration diagram illustrating in detail the mounting positions of an absolute humidity sensor, a dew point temperature sensor and a regeneration exhaust temperature sensor and the hybrid operating apparatus of the regenerative heater shown in FIG. 2 according to theses sensors.

FIG. 3 is a configuration diagram illustrating in detail the mounting positions of the absolute humidity sensor, the dew point temperature sensor and the regeneration exhaust temperature sensor and the hybrid operating apparatus of the regenerative heater shown in FIG. 2 according to theses sensors. Although the other components except the absolute humidity sensor 30, the dew point temperature sensor 32 and the regeneration exhaust temperature sensor 34 of FIG. 2 are not illustrated in FIG. 3, those skilled in the art can readily understand the correlation between FIGS. 2 and 3, based on the descriptions of FIGS. 2 and 3. In FIG. 3, components identical to those described in FIGS. 1 and 2 are designated by like reference numerals.

The hybrid operating apparatus of the regenerative heater of FIG. 3 includes a pre-cooler 10, a processing fan 12, the dehumidifying rotor 14, a regenerative fan 20, an after-cooler 22, a return cooler 28, the absolute humidity sensor 30, the dew point temperature sensor 32 and the regeneration exhaust temperature sensor 34.

The pre-cooler 10 includes a damper 10a, a filter 10b, a heating coil 10c, a first cooling coil 10d, a second cooling coil 10e and a moisture barrier mechanism 10f. Air flowed in the pre-cooler 10 through the damper 10a is purified while passing through the filter 10b. The air passing through the filter 10b is subjected to heat exchange while sequentially passing through the heating coil 10c, the first cooling coil 10d and the second cooling coil 10e, and therefore, the temperature of the air is decreased to a predetermined value. The moisture barrier mechanism 10f allows water condensed while being cooled to a predetermined temperature not to be transferred to the processing fan 12.

The processing fan 12 is mounted at an outlet side of the pre-cooler 10. The processing fan 12 sucks external air and provide motive power for forming the flow of air in the apparatus. The air passing through the processing fan 12 is supplied to a dehumidification region 14a and a fuzzy region 14c in the dehumidifying rotor 14.

The dehumidifying rotor 14 is formed in a cylindrical shape. The dehumidifying rotor 14 dehumidifies the air to a low-dew point temperature or less using a dry rotary dehumidification method. The dehumidifying rotor 14 is divided into the dehumidification region 14a, a regeneration region 14b and the fuzzy region 14c about the center axis thereof. The dehumidification region 14a performs dehumidification of the air. The regeneration region 14b removes moisture absorbed in the dehumidification region 14a. The fuzzy region 14c regulates the temperature in the dehumidification region 14a to a temperature suitable for dehumidification so that the dehumidification in the dehumidification region 14a is actively performed. The air passing through the fuzzy region 14c is heated by the regenerative heater 18 and then passes through the regeneration region 14b. That is, the air heated by the regenerative heater 18 removes the moisture absorbed in the dehumidifying rotor 14 while passing through the regeneration region 14b.

The regenerative fan 20 is mounted to communicate with the regeneration region 14b. The regenerative fan 20 sucks the air heated by the regenerative heater 18 through the regeneration region 14b and exhausts the sucked air to the outside.

The after-cooler 22 includes a cooling coil 22a and a heating coil 22b. The after-cooler 22 regulates the temperature of the air dehumidified by the dehumidifying rotor 14 and supplies the air having the regulated temperature to a dry room 24. A return flow path (return duct) 26 allowing a portion of the air in the dry room 24 to be reused is connected to the dry room 24. The return flow path 26 is connected to the return cooler 28.

The return cooler 28 includes a damper 28a, a filter 28b and a cooling coil 28c. The damper 28a controls the amount of returned air. The filter 28b purifies the returned air flowed in the return cooler 28 through the damper 28a. The cooling coil 28c allows the air passing through the filter 28b to have the same temperature condition as that of the air passing through the pre-cooler 10. The air passing through the return cooler 28 is sucked into the processing fan 12 by a driving force of the processing fan 12.

The absolute humidity sensor 30 is mounted between an outlet of the processing fan 12 and an inlet of the dehumidifying rotor 14. The absolute humidity sensor 30 senses an absolute humidity of the air supplied to the dehumidifying rotor 14 during the operation of the apparatus and transmits the sensed absolute humidity to the control unit 38. The absolute humidity indicates the amount of steam contained in the air. Generally, the absolute humidity is high in the summer season in which temperature is high, and the absolute humidity is low in the winter season in which temperature is low. Therefore, in a case where the absolute humidity is high, the regeneration temperature of the regenerative heater 18 is regulated to be high by the control unit 38. In a case where the absolute humidity is low, the regeneration temperature of the regenerative heater 18 is regulated to be low by the control unit 38.

The dew point temperature sensor 32 is preferably mounted at a front end of the return cooler 28 (e.g., the front end of the damper 28a). Alternatively, the dew point temperature sensor 32 may be mounted between the damper 28a and the filter 28b. The dew point temperature sensor 32 senses a dew point temperature of the air returned from the dry room 24 through the return flow path 26 and transmits the sensed dew point temperature to the control unit 38.

The regeneration exhaust temperature sensor 34 is preferably mounted at a front or rear end of the regenerative fan 20. Here, the front end of the regenerative fan 20 refers to a space between the regenerative fan 20 and the dehumidifying rotor 14, and the rear end of the regenerative fan 20 refers to an exhaust duct of air exhausted to the outside by the regenerative fan 20. It will be apparent that the regeneration exhaust temperature sensor 34 may be mounted at an outlet side of the regenerative fan 20. The regeneration exhaust temperature sensor 34 senses a temperature of the exhaust air regenerated in the dehumidifying rotor 14 and transmits the sensed temperature to the control unit 38.

Next, an operation of the hybrid operating apparatus of the regenerative heater according to the embodiment of the present invention will be described with reference to the flowchart of FIG. 4. Hereinafter, portions related to the hybrid operation of the regenerative heater will be mainly described. The other portions are almost identical to those in the related art, and therefore, their detailed descriptions will be omitted.

First, if the operation of the apparatus is normally started, the absolute humidity sensor 30 mounted between the outlet of the processing fan 12 and the inlet of the dehumidifying rotor 14 senses an absolute humidity of air supplied to the dehumidifying rotor 14 (S10).

The value of the sensed absolute humidity is transmitted to the control unit 38. The control unit 38 extracts a regeneration temperature corresponding to the input absolute humidity from the memory unit 32 (S12).

The control unit 38 operates the regenerative heater 18 to the extracted regeneration temperature (S14).

In this case, the dew point temperature sensor 32 mounted at the front end of the return cooler 28 senses a dew point temperature of air returned through the return flow path 26 and transmits the sensed dew point temperature to the control unit 38. In addition, the regeneration exhaust temperature sensor 34 mounted at the front or rear end of the regenerative fan 20 senses a temperature of exhaust air regenerated in the dehumidifying rotor 14 and transmits the sensed temperature to the control unit 38.

Accordingly, the control unit 38 compares the input dew point temperature with a predetermined setup value (e.g., about −45° C.) (S16).

As a result, in a case where the input dew point temperature is the setup value or less ("Yes" at step S16), the control unit 38 operates the regenerative heater 18 by disregarding a currently set regeneration temperature and recovering the regeneration temperature of the regenerative heater 18 to a recovery temperature (e.g., 180° C.) (S18). In the above, it has been determined whether the input dew point temperature is the setup value or less. However, if the input dew point temperature is lower than the setup value, the control unit 38 may operate the regenerative heater 18 by recovering the regeneration temperature of the regenerative heater 18 to a recovery temperature (e.g., 180° C.).

If the input dew point temperature is higher than the setup value ("No" at step S16), the control unit 38 compares a regeneration exhaust temperature sensed by the regeneration exhaust temperature sensor 34 with a set range of regeneration exhaust temperature (S20 and S22).

As a result, if the regeneration exhaust temperature sensed by the regeneration exhaust temperature sensor 34 is lower than the minimum value of the set range of regeneration exhaust temperature (e.g., 40 to 60° C.) ("Yes" at step S20), the dehumidification performance is rapidly degraded, and therefore; the dehumidifier cannot perform a normal operation. In order to prevent such a problem, the control unit 38, as described at step S18, operates the regenerative heater 18 by disregarding a currently set regeneration temperature and recovering the regeneration temperature of the regenerative heater 18 to a recovery temperature (e.g., 180° C.).

Meanwhile, if the regeneration exhaust temperature sensed by the regeneration exhaust temperature sensor 34 is lower than the maximum value of the set range of regeneration exhaust temperature (e.g., 40 to 60° C.) ("Yes" at step S22), a dehumidification operation is performed more than is necessary, and therefore, unnecessary power loss occurs. In order to prevent the unnecessary power loss (i.e., to save energy), the control unit 38 controls the current regeneration temperature of the regenerative heater 18 according to the sensed regeneration exhaust temperature (S24). For example, if the sensed regeneration exhaust temperature is about 61 to 64° C., the control unit 38 disregards the previous regeneration temperature and controls the regeneration temperature of the regenerative heater 18 to about 170° C. If the sensed regeneration exhaust temperature is about 65 to 69° C., the control unit 38 disregards the previous regeneration temperature and controls the regeneration temperature of the regenerative heater 18 to about 160° C. If the sensed regeneration exhaust temperature is about 70° C., the control unit 38 disregards the previous regeneration temperature and controls the regeneration temperature of the regenerative heater 18 to about 150° C. If the sensed regeneration exhaust temperature exceeds 70° C., the control unit 38 disregards the previous regeneration temperature and controls the regeneration temperature of the regenerative heater 18 to about 140° C.

If the sensed dew point temperature is higher than the setup value and the sensed regeneration exhaust temperature is within the set range of regeneration exhaust temperature, the control unit 38 operates the regenerative heater 18 to the regeneration temperature corresponding to the sensed absolute humidity.

Figure 4:
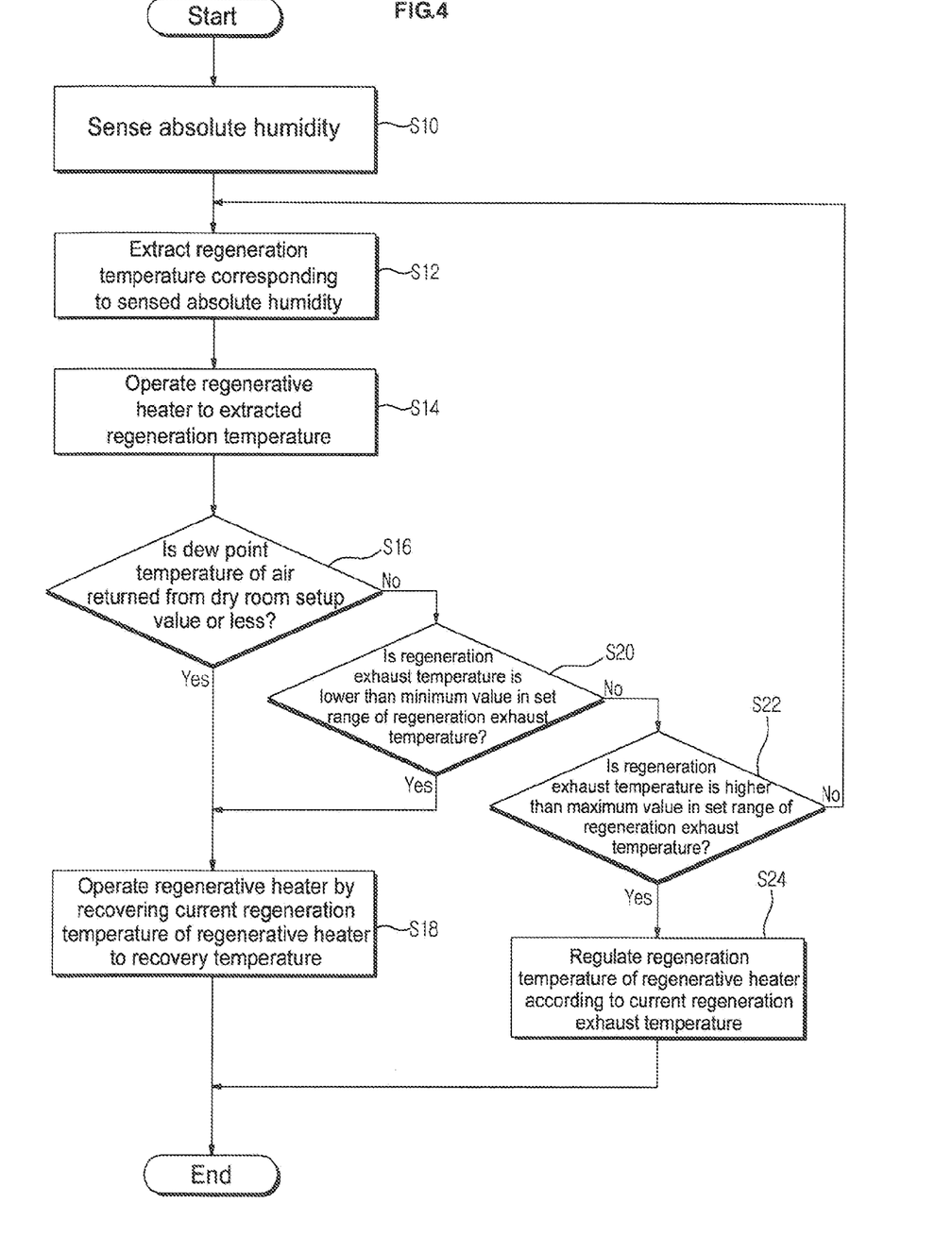
FIG. 4 is a flowchart illustrating a hybrid operating method of the regenerative heater according to the embodiment of the present invention.

Although not shown in the flowchart of FIG. 4, the display unit 40 displays a control state of the regenerative heater 18 according to whether the control of the regenerative heater 18 is performed when the sensed dew point temperature is the setup value or less, or performed when the sensed regeneration exhaust temperature is out of the set range of regeneration exhaust temperature. For example, a character message such as "the regenerative heater is being controlled to operate at 180° C. because the current dew point temperature is lower than the setup value," "the regenerative heater is being controlled to operate at 180° C. because the current regeneration exhaust temperature is lower than the minimum value in the set range of regeneration exhaust temperature," or "the regenerative heater is being controlled to operate at 160° C. because the current regeneration exhaust temperature is 65° C." is displayed on the display unit 40. The man on duty (worker) can recognize a current control state while watching a character message displayed on the display unit 40.

Although not described in the embodiment of the present invention, a defect diagnostic mechanism may be additionally employed to diagnose the presence of a defect of the absolute humidity sensor 30, the dew point temperature sensor 32 or the regeneration exhaust temperature sensor 34. In a case where a current value is remarkably different from usual values sensed by the absolute humidity sensor 30, the dew point temperature sensor 32 or the regeneration exhaust temperature sensor 34, the defect diagnostic mechanism can decide that the corresponding sensor is defected. Accordingly, if the defected sensor is displayed on the display unit 40, so that the worker can immediately replace the defected sensor with a new sensor.

Although the present invention has been described in connection with the accompanying drawings and the preferred embodiments, the present invention is not limited thereto but defined by the appended claims. Accordingly, it will be understood by those skilled in the art that various modifications and changes can be made thereto without departing from the spirit and scope of the invention defined by the appended claims.

The invention claimed is:

1. A hybrid operating apparatus of a regenerative heater, the apparatus comprising:
   an absolute humidity sensing unit configured to sense an absolute humidity of air supplied to a dehumidifying rotor;
   a dew point temperature sensing unit configured to sense a dew point temperature of air returned from a dry room;
   a regeneration exhaust temperature sensing unit configured to sense a temperature of exhaust air regenerated in the dehumidifying rotor;
   a control unit configured to operate the regenerative heater to a regeneration temperature corresponding to the sensed absolute humidity, wherein the control unit controls a current regeneration temperature of the regenerative heater according to a result obtained by comparing the sensed dew point temperature with a setup value and a result obtained by comparing the sensed regeneration exhaust temperature with a set range of regeneration exhaust temperature; and
   a memory unit configured to store the regeneration temperature of the regenerative heater, set to correspond to a corresponding regeneration exhaust temperature when the regeneration temperature of the regenerative heater, corresponding to the sensed absolute humidity, and the sensed regeneration exhaust temperature are higher than the set range of regeneration exhaust temperature,
   wherein the setup value is a value previously set in the control unit.

2. The apparatus according to claim 1, wherein, when the sensed dew point temperature is the setup value or less, the control unit operates the regenerative heater by recovering the current regeneration temperature of the regenerative heater to a predetermined recovery temperature.

3. The apparatus according to claim 1, wherein, when the sensed regeneration exhaust temperature is lower than the minimum value in the set range of regeneration exhaust temperature, the control unit operates the regenerative heater by recovering the current regeneration temperature of the regenerative heater to the predetermined recovery temperature.

4. The apparatus according to claim 1, wherein, when the sensed regeneration exhaust temperature is higher than the maximum value in the set range of regeneration exhaust temperature, the control unit operates the regenerative heater to a regeneration temperature set to correspond to the sensed regeneration exhaust temperature.

5. The apparatus according to claim 1, wherein the absolute humidity sensing unit is mounted between an outlet of a processing fan sucking external air and an inlet of the dehumidifying rotor.

6. The apparatus according to claim 1, wherein the dew point temperature sensing unit is mounted at a front end of a return cooler.

7. The apparatus according to claim 1, wherein the regeneration exhaust temperature sensing unit is mounted at a front or rear end of a regenerative fan.

8. The apparatus according to claim 1, further comprising a display unit configured to display a control state of the regenerative heater according to whether the control of the regenerative heater is performed when the sensed dew point temperature is the setup value or less, or performed when the sensed regeneration exhaust temperature is out of the set range of regeneration exhaust temperature.

9. A hybrid operating method of a regenerative heater, the method comprising:
   sensing, by an absolute humidity sensor, an absolute humidity of air supplied to a dehumidifying rotor;
   sensing, by a dew point temperature sensor, a dew point temperature of air returned from a dry room;
   sensing, by a regeneration exhaust temperature sensor, a temperature of exhaust air regenerated in the dehumidifying rotor; and
   operating, by a controller, the regenerative heater to a regeneration temperature corresponding to the sensed absolute humidity, wherein the control unit controls a current regeneration temperature of the regenerative heater according to a result obtained by comparing the sensed dew point temperature with a setup value and a result obtained by comparing the sensed regeneration exhaust temperature with a set range of regeneration exhaust temperature,
   wherein the setup value is a value previously set in the control unit.

10. The method according to claim 9, wherein the controlling includes operating the regenerative heater by recovering the current regeneration temperature of the regenerative heater to a predetermined recovery temperature, when the sensed dew point temperature is the setup value or less.

11. The method according to claim 9, wherein the controlling includes operating the regenerative heater by recovering the current regeneration temperature of the regenerative heater to the predetermined recovery temperature, when the sensed regeneration exhaust temperature is lower than the minimum value in the set range of regeneration exhaust temperature.

12. The method according to claim 9, wherein the controlling includes operating the regenerative heater to a regeneration temperature set to correspond to the sensed regeneration exhaust temperature, when the sensed regeneration exhaust temperature is higher than the maximum value in the set range of regeneration exhaust temperature.

* * * * *